United States Patent [19]

Fujioka

[11] 4,250,228

[45] Feb. 10, 1981

[54] ELECTROSTATIC RECORD ELEMENT OF ELECTROCONDUCTIVE BASE SHEET COATED WITH RESIN LAYER CONTAINING ZNO POWDER OF SPECIFIED RESISTIVITY

[75] Inventor: Hironari Fujioka, Amagasaki, Japan

[73] Assignee: Kanzaki Paper Manufacturing Co., Ltd., Tokyo, Japan

[21] Appl. No.: 53,424

[22] Filed: Jun. 29, 1979

[30] Foreign Application Priority Data

Jul. 4, 1978 [JP] Japan .................................. 53-81794

[51] Int. Cl.[3] ........................... B32B 9/04; G02B 5/30

[52] U.S. Cl. ................................ 428/539; 346/153.1; 252/501.1; 252/518; 430/90

[58] Field of Search ....................... 252/500, 501, 518; 430/90, 95; 346/153; 428/931, 929, 539, 328

[56] References Cited

U.S. PATENT DOCUMENTS 3,776,724 12/1973 Usmani .................................. 430/90

OTHER PUBLICATIONS

Chemical Abstracts, vol. 48, col. 9780h, vol. 72, col. 71020d, 7267n.

*Primary Examiner*—John D. Welsh
*Attorney, Agent, or Firm*—Armstrong, Nikaido, Marmelstein & Kubovcik

[57] ABSTRACT

An electrostatic record material comprising an electroconductive base sheet and a record layer formed on the base sheet, said electroconductive base sheet having an electroconductive layer containing (i) a zinc oxide powder having a specific resistivity of 0.01 to 500 ohm-cm at pressure of 150 $kg/cm^2$ and (ii) a water-soluble or water-dispersible adhesive resin.

5 Claims, 1 Drawing Figure

Figure 1:
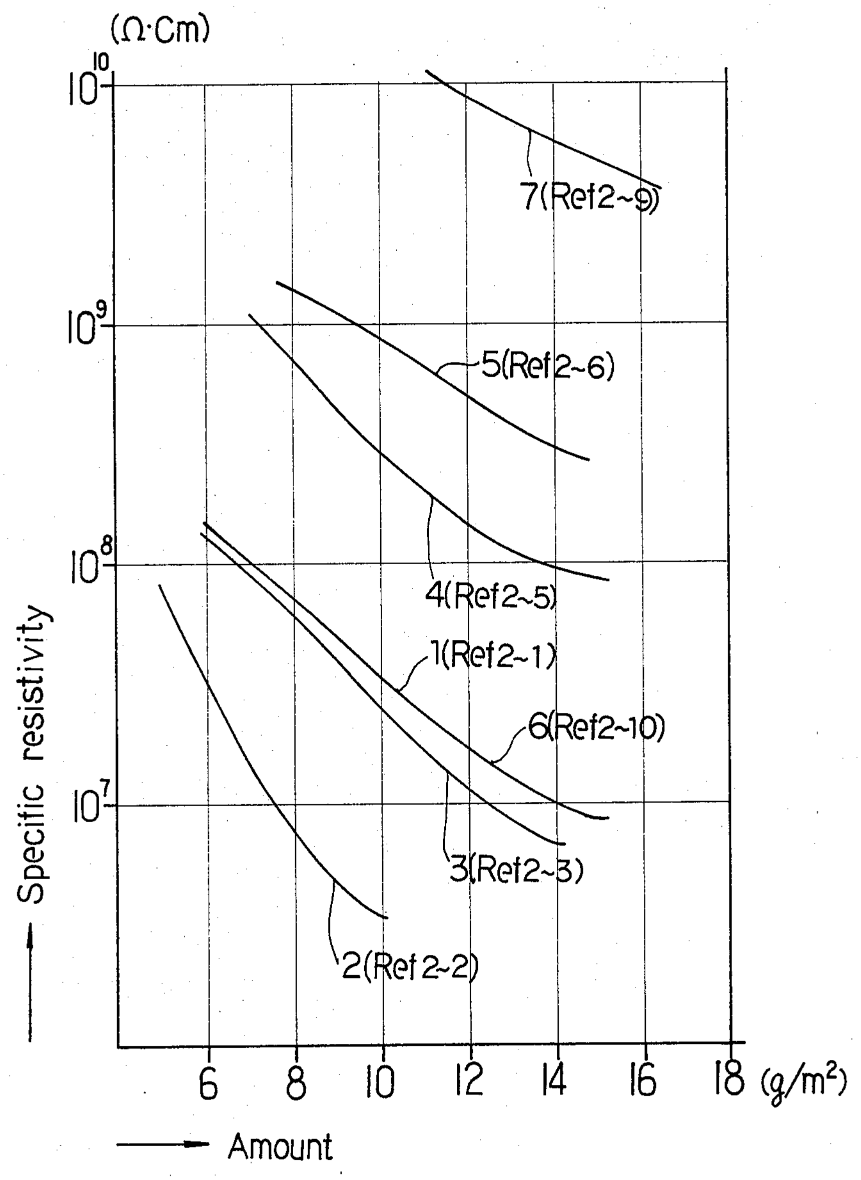

ELECTROSTATIC RECORD ELEMENT OF ELECTROCONDUCTIVE BASE SHEET COATED WITH RESIN LAYER CONTAINING ZNO POWDER OF SPECIFIED RESISTIVITY

This invention relates to an electrostatic record material, and more particularly to an electrostatic record material comprising an electroconductive base sheet and a record layer formed on the base sheet and consisting essentially of insulating resin.

Electrostatic recording processes use a record material comprising an electroconductive base sheet and a record layer formed on the base sheet and composed mainly of insulating resin. With these processes, voltage pulses are applied directly to the record layer of the material or electrostatic latent images formed on a plate are transferred onto the record layer to form electrostatic latent images on the record layer, and the latent images are converted to visible images with a toner. Electrostatic recording processes are widely used for facsimile systems, copying machines and other printers.

While facsimile systems were operated at a low speed of 5 to 6 min/A-4-size sheet, such low-speed machines have been replaced by medium-speed machines (2-3 min/A-4-size sheet) or high-speed machines (1 min/A-4-size sheet or higher) with an increase in the amount of information to be handled. Accordingly the voltage pulse width used has changed from 500 $\mu$.sec or longer to 50–100 $\mu$.sec or to 20 $\mu$.sec or shorter. To obtain satisfactory records with stability in accordance with the various changes attendant on the speed-up of the facsimile systems, the electrostatic record material must have reduced impedance. Most suitably the electroconductive base sheet of the electrostatic record material usually has a surface electrical resistivity of $10^6$ to $10^{10}$ ohms. Especially for use in high-speed facsimile systems, the record material must meet a very strict resistivity requirement. For example, a reduced image density will result at a surface electrical resistivity of $10^{11}$ ohms, and little or no record will be reproduced at $10^{12}$ ohms. Accordingly the electroconductive base sheet of record material for use in usual facsimile processes is adapted to have a resistivity of $10^6$ to $10^{10}$ ohms at usual humidity, but the conductive base sheet has a higher resistivity in an atomsphere of lower humidity because the treating agent usually used for rendering the base sheet electroconductive is an electroconductive resin the degree of ionization of which reduces with a decrease in the moisture content of the base sheet to give a lower conductivity, namely a higher resistivity.

An electrostatic record material has been developed which is free of the drawback resulting from the use of such an electroconductive resin (Published Unexamined Japanese Patent Application No. 25140/1976). In place of the conventional electroconductive resin, a zinc oxide powder having a specific resistivity of $1\times10^3$ to $9\times10^5$ ohm-cm is used for this material. The material, however, still has the following drawbacks. When the zinc oxide powder having such a specific resistivity is used with a water-soluble or water-dispersible adhesive such as polyvinyl alcohol, methyl cellulose, styrene-butadiene copolymer or the like, the resulting material will have reduced conductivity, consequently giving a record of low density. For this reason, the adhesives usable with the powder are limited to those of the organic solvent type incorporating methyl methacrylate, ethyl methacrylate, styrene, melamine, cellulose acetate, vinyl acetate or like polymer, acrylic monomer-styrene copolymer, vinyl chloride-vinyl acetate copolymer, or like resin which is soluble in organic solvents. The use of the organic solvent nevertheless entails various drawbacks such as inconvenience of handling, hazard of fire and expensiveness.

An object of this invention is to provide an electrostatic record material including an electroconductive base sheet which retains a specific resistivity of up to $10^{10}$ ohm-cm even at low humidities despite the use of a water-soluble or water-dispersible resin adhesive.

Another object of the invention is to provide an electrostatic record material which is usable with high stability even for high-speed facsimile processes.

These objects and other features of this invention will become apparent from the following description.

The foregoing objects can be fulfilled by the use of a zinc oxide powder serving as the main electroconductive agent and having a specific resistivity of 0.01 to 500 ohm-cm at pressure of 150 kg/cm$^2$ in place of the conventional electroconductive resin or known zinc oxide powder having a specific resistivity of $1\times10^3$ to $9\times10^5$ ohm-cm. Stated more specifically the present invention provides an electrostatic record material comprising an electroconductive base sheet and a record layer formed on the base sheet and consisting essentially of an insulating resin, the record material being characterized in that the electroconductive base sheet has an electroconductive layer containing (a) a zinc oxide powder having a specific resistivity of 0.01 to 500 ohm-cm at pressure of 150 kg/cm$^2$, and (b) a water-soluble or water-dispersible adhesive resin.

The invention has been accomplished based on the surprising novel finding that when the electroconductive base sheet of electrostatic record material incorporates as its electroconductive component a zinc oxide powder having a specified specific resistivity of 0.01 to 500 ohm-cm at pressure of 150 kg/cm$^2$, the base sheet retains a specific resistivity of up to $10^{10}$ ohm-cm even at low humidities although containing a water-soluble or water-dispersible resin adhesive.

The drawing shows a FIGURE graphically depicting resistivity data of recording sheets made according to the invention.

The zinc oxide powder to be used in this invention has a specified specific resistivity of 0.01 to 500 ohm-cm at pressure of 150 kg/cm$^2$. The specific zinc oxide powder is prepared by admixing with zinc oxide a small amount of at least one of $Al_2O_3$, $Cr_2O_3$, $Ga_2O_3$, $In_2O_3$ and a compound which produces such an oxide when heated at a high temperature, and heating the mixture at a high temperature preferably in a reducing atmosphere. Examples of useful compounds which produce $Al_2O_3$ are aluminum chloride, aluminum sulfate, aluminum nitrate, etc., compounds producing $Cr_2O_3$ include chromium chloride, chromium sulfate, etc., those producing $Ga_2O_3$ include gallium chloride, gallium sulfate, gallium nitrate, etc., and those producing $In_2O_3$ include indium chloride, indium sulfate, indium nitrate, etc. The specific resistivity of the zinc oxide powder obtained is adjustable by suitably determining the kind and amount of the additive used, heating temperature, heating time, cooling conditions, etc. The amount of the additive to be used, although not particularly limited, is usually about 0.1 to about 5 mole %, preferably about 0.5 to about 2 mole %. The mixture is heated usually at 800° to 1100° C. for 2 to 5 hours. After heating, the product is cooled slowly preferably at a rate of 5° to 10° C./min.

The cooled product is pulverized as desired. The zinc oxide powder thus prepared for use in this invention is usually 0.5 to 3μ, preferably about 0.8 to about 2μ, in particle size as determined by the Blain permeability method.

The zinc oxide powder useful in this invention must have a specific resistivity of 0.01 to 500 ohm-cm, preferably 1 to 400 ohm-cm, at pressure of 150 kg/cm$^2$. Zinc oxide powders lower than 0.01 ohm-cm in specific resistivity are very difficult to prepare. Production of such powder, if attempted, requires use of an increased amount of an additive which produces $Al_2O_3$ or like oxide and necessitates a higher heating temperature. Consequently the zinc oxide powder obtained has a slightly blackish color and includes a greatly increased amount of agglomerates of particles due to sintering. Such powder is extremely difficult to formulate into a coating composition and seriously impairs the quality of the record material produced. Conversely zinc oxide powders higher than 500 ohm-cm in specific resistivity, when used conjointly with a water-soluble or water-dispersible adhesive, exhibit an increased surface resistivity, substantially failing to give the desired record density even at the ambient humidity.

The specific resistivity of the zinc oxide powder in this invention is measured by the following method. The zinc oxide powder (240 to 260 mg) is allowed to stand in an atmosphere at 20° C. and 60% RH for 2 hours and is thereafter placed into a container of polytetrafluoroethylene having a specimen packing tube 4.1 mm in diameter. The powder is pressed with brass cylinder, 4 mm in diameter, from opposite ends of the tube at four different pressure values in the range of 100 to 200 kg/cm$^2$. The specific resistivity of the powder is measured at each of the pressure values. The resistivity values obtained are plotted to determine the specific resistivity at 150 kg/cm$^2$ from the curve.

Examples of water-soluble or water-dispersible adhesive resins useful in this invention are various adhesive resins which are usually used for coating paper and which include celluloses such as methyl cellulose, hydroxyethyl cellulose and carboxymethyl cellulose, starch, modified starches such as oxidized starch, etherified starch and esterified starch, polyvinyl alcohol, polyvinyl pyrrolidone, sodium alginate, polyacrylamide, alkali salts of isobutene-maleic anhydride copolymer, alkali salts of styrene-maleic anhydride copolymer, alkali salts of styrene-methacrylic acid copolymer, styrene-butadiene copolymer latex, methyl methacrylate-butadiene copolymer latex, polyvinyl acetate latex, polyacrylic acid latex, etc. Also useful are electroconductive resins which are usually used as electroconductive agents for electrostatic record materials of the type described.

In this invention, such water-soluble or water-dispersible resins are used in an amount suitably determined in accordance with the kind of the resin. Usually about 3 to about 50 parts by weight of the resin is used per 100 parts by weight of the zinc oxide powder.

According to this invention, the zinc oxide powder and the water-soluble or water-dispersible adhesive resin are dissolved or dispersed in water to obtain a coating composition, which may further contain other additives. Useful additives are a wide variety of those heretofore used for the electrostatic record materials of the type described, such for example as clay, kaolin, calcium carbonate, titanium oxide, aluminum hydroxide and like pigments; sodium silicate, sodium phosphate, sodium polyacrylate and like dispersants; octyl alcohol, cyclohexanol, tributyl phosphate, silicone, ethylene glycol and like defoaming agents; phenylsalicylic acid, hydroxy-benzophenone, 2-(hydroxyphenyl)-benzotriazole and like ultraviolet absorbers; and dyes. The amount of the additive to be used, which varies with the kind of the additive, is usually 0.001 to 50 parts by weight, preferably about 0.01 to about 20 parts by weight, per 100 parts by weight of the zinc oxide powder.

The coating composition prepared is applied to a usual base sheet such as paper, synthetic paper or the like by any means such as bar coater, air knife coater or blade coater, or by impregnation with use of a size press. The composition is applied to the base sheet in such an amount that the sheet will have a surface resistivity of $10^6$ to $10^{10}$ ohms at the ambient humidity. The amount is usually 2 to 20 g/m$^2$, preferably about 5 to about 15 g/m$^2$ by dry weight.

According to this invention, the record layer can be formed from any of various coating compositions usually used and including those of the organic solvent type and aqueous solution or dispersion type. The resins useful for preparing such coating compositions are those having insulating properties and including polymers or copolymers of vinyl monomers such as vinyl chloride, vinyl acetate, vinyl acetal, vinylidene chloride, ethylene, styrene, butadiene, acrylate, methacrylate, acrylonitrile, acrylic acid, methacrylic acid, etc., silicone resin, polyester resin, polyurethane resin, alkyd resin, epoxy resin and the like. These resins are used singly or in admixture as dissolved in an organic solvent or dispersed in water. The resins useful for the electrostatic record material of this invention are not limited to these resins, but other suitable known insulating resins are also usable. The coating composition may further incorporate additives usually used in the art, such as inorganic pigments, finely divided polymer particles, starch powder and dyes. The composition is applicable by usual means in an amount which, although not particularly limited, is usually 2 to 10 g/m$^2$, preferably 4 to 7 g/m$^2$ by dry weight.

While another electroconductive layer is conventionally formed on the other surface of the base sheet opposite to the record layer bearing surface thereof when so required, such a conductive layer can be similarly formed in this invention if so desired. The additional conductive layer need not always be the same as the specific conductive layer of this invention underlying the record layer but can be a conductive layer composed of a usual electroconductive resin.

The electrostatic record material thus prepared according to this invention provides record images at a high density with high stability even at extremely low humidities.

Given below for a better understanding of the present invention are reference examples in which the zinc oxide powder to be used in this invention is prepared, and examples of the invention.

REFERENCE EXAMPLE 1

(Preparation of an electroconductive zinc oxide powder)

To zinc oxide (product of Hakusui Kagaku Co., Ltd., Japan) is added the specified mole % of an aqueous solution of the specified compound shown in Table 1 serving as a metal oxide component, and these ingredients are fully mixed together. The mixture is dried at 100° C. and then pulverized to particles of 0.2μin size. The particles are heated in a muffle furnace at the temperature for the specified minutes shown in Table 1 to prepare an electroconductive zinc oxide powder. The resulting zinc oxide powders thus obtained are checked for the specific resistivities and the results are shown in Table 1 below.

TABLE 1

| Ref. Ex. No. | Additive Kind | Additive Amount (mol %) | Heating Temp. (°C.) | Heating Time (min) | Specific resistivity of zinc oxide (ohm-cm) | Property | Note |
|---|---|---|---|---|---|---|---|
| Ref. 1-1 | $Al(NO_3)_3 \cdot 9H_2O$ | 0.5 | 900 | 90 | 11 | O | This invention |
| -2 | " | 1.0 | 1000 | 90 | 0.2 | O | " |
| -3 | " | 0.5 | 950 | 90 | 5.0 | O | " |
| -4 | " | 0.4 | 900 | 60 | 90 | O | " |
| -5 | " | 0.2 | 900 | 60 | 200 | O | " |
| -6 | $CrCl_3 \cdot 6H_2O$ | 1.0 | 1000 | 90 | 150 | O | " |
| -7 | $Ga_2(SO_4)_3 \cdot 18H_2O$ | 0.2 | 1000 | 90 | 450 | O | " |
| -8 | $InCl_3 \cdot 6H_2O$ | 0.5 | 900 | 90 | 150 | O | " |
| -9 | $Al(NO_3)_3 \cdot 9H_2O$ | 1.5 | 1050 | 90 | 0.008 | X | Comp. Example |
| -10 | " | 0.1 | 900 | 60 | 850 | O | " |

The mark "O" indicates that the composition can be prepared without any trouble.
The mark "X" indicates that the ingredients can not be formulated into a composition.

(Preparation of a coating composition)

The zinc oxide powder (100 parts by weight) obtained in Reference Example 1 and 100 parts by weight of water are mixed together in a ball mill for 1 hour to obtain a uniform dispersion. With the dispersion is admixed the specified amount of an aqueous solution of the resin shown in Table 2 to prepare a coating composition. The numbers of the zinc oxide powders shown in Table 2 are those shown in Table 1. When the zinc oxide powder Ref. 1-9 is used, no coating composition is obtained.

TABLE 2

| Ref. Example No. | Zinc oxide powder | Aqueous solution of resin: Resin | Concentration (%) | Amount (part by weight) | Note |
|---|---|---|---|---|---|
| Ref. 2-1 | Ref. 1-1 | A | 7 | 90 | This invention |
| -2 | -2 | A | 7 | 90 | " |
| -3 | -3 | A | 7 | 90 | " |
| -4 | -4 | A | 7 | 90 | " |
| -5 | -5 | A | 7 | 90 | " |
| -6 | -9 | A | 7 | 90 | Comp. Example |
| -7 | -10 | A | 7 | 90 | " |
| -8 | -1 | B | 10 | 100 | This invention |

A and B indicate the following:
A: Methyl cellulose (trade mark: "MCSM-15", product of SHINETSU KAGAKU Co., Ltd., Japan)
B: Polyvinylalcohol (trade mark: "PVA 105", KURARAY Co., Ltd., Japan)

REFERENCE EXAMPLE 3

(Preparation of a coating composition)

The zinc oxide powder No.Ref.1-6 obtained in Reference Example 1 (100 parts by weight) is mixed with 100 parts by weight of water and 90 parts by weight of 5% aqueous solution of carboxymethylcellulose in a ball mill for 1 hour to prepare a coating composition (hereinafter referred to as Ref. 3).

REFERENCE EXAMPLE 4

(Preparation of a coating composition)

To 100 parts by weight of the zinc oxide powder Ref.1-7 obtained in Reference Example 1, is added 25 parts by weight of 10% aqueous solution of oxidized starch, 50 parts by weight of 5% aqueous solution of sodium salt of isobutene-maleic anhydride copolymer, 20 parts by weight of calcium carbonate and 75 parts by weight of water and then the resulting mixture is dispersed in a ball mill for 1 hour to prepare a coating composition (hereinafter referred to as Ref. 4).

REFERENCE EXAMPLE 5

(Preparation of a coating composition)

To 100 parts by weight of the zinc oxide powder Ref.1-8 obtained in Reference Example 1 is added 50 parts by weight of 10% aqueous emulsion of polyvinylalcohol, 5 parts by weight of 50% aqueous solution of styrene-butadiene copolymer and 100 parts by weight of water and then the resulting composition is dispersed in a ball mill for 1 hour to prepare a coating composition (hereinafter referred to as Ref. 5).

EXAMPLE 1

(Preparation of an electroconductive base sheet)

The coating composition Ref.2-1 is applied by a coating rod to one side of a web of wood-free paper weighing 49 g/m² in an amount of 5 g/m² by dry weight, and the coated web is dried by an air drier at 100° C. for 1 minute to prepare an electroconductive base sheet.

Two electroconductive base sheets are prepared in the same manner as in the above procedure except that 10 g/m² and 15 g/m² of the coating compositions are employed in place of 5.0 g/m² of the coating composition.

Three sheets thus obtained are allowed to stand at 20° C. and 50% RH for 24 hours and checked for specific resistivities by TERAOHM meter (trade mark: "VE-30 type", product of KAWAGUCHI DENKI Co., Ltd., Japan). The results obtained are shown as curve 1 in the FIGURE.

EXAMPLE 2

(Preparation of electroconductive base sheet)

Six electroconductive base sheets are prepared in the same manner as in Example 1 except that coating compositions Ref.2-2, Ref.2-3, Ref.2-4, Ref. 2-5, Ref.2-7 and Ref.2-8 are used in place of the above coating composition Ref.2-1 and checked for specific resistivities by the above manner. The results are also shown as curves 2 to 7 in the FIGURE.

EXAMPLE 3

One of the seven kinds of electroconductive coating compositions used in the above examples 1 and 2 is applied by an air knife coater to a web of wood-free paper weighing 49 g/m$^2$ in amounts of 10 g/m$^2$ on one side and 5 g/m$^2$ on the other side by dry weight. The paper web is dried to obtain an electroconductive base sheet. The same procedure as above is repeated with use of the other six kinds of compositions.

A record layer forming composition prepared by adding 20 parts of calcium carbonate to 400 parts of 20% methyl ethyl ketone solution of vinyl chloride-vinyl acetate (50:50) copolymer and stirring the mixture in a mixer to fully disperse the carbonate in the solution is applied by a bar coater to each of the base sheets over the first-mentioned side thereof in an amount of 5 g/m$^2$ by dry weight. The coated sheets are dried to obtain sheets of electrostatic record material. For comparison, a sheet (comparison sheet I) of electrostatic record material is prepared in the same manner as above except that the electroconductive base sheet used is produced by coating a web of wood-free paper weighing 49 g/m$^2$ with a 15% aqueous solution of polyvinylbenzyltrimethyl ammoniumchloride (trade mark: "ECR-34," product of the Dow Chemical Co., U.S.A.) in an amount of 3 g/m$^2$ by dry weight on each side of the web, and drying the web.

The eight sheets of electrostatic record material thus obtained are tested for recording characteristics by the following method. Each of the sheets is allowed to stand in a hot air drier at 55° C. for 30 minutes and dried to an extremely low water content of not higher than 2%. The sheet is then recorded by a high-speed facsimile placed in an atmosphere having a temperature of 20° C. and 20% RH, under the conditions of a line density of 8 lines/mm, pulse width of 12 μ.sec, pin voltage of −300 V and sub-voltage of +300 V. The density of the images is measured by Macbeth densitometer Model No. RD-100R (manufactured by Macbeth Co. Ltd.) in terms of reflection density. The result is given in Table 3, which reveals that whereas no images are reproduced on the record sheets of the comparison examples, images are formed with a high density and stability on the record sheets of the examples of this invention.

TABLE 3

| No. | Coating composition used in Examples 1 and 2 | Density of image | Note |
|---|---|---|---|
| 1 | Ref. 2-1 | 1.1–1.2 | This invention |
| 2 | Ref. 2-2 | 1.1–1.2 | " |
| 3 | Ref. 2-3 | 0.9–1.2 | " |
| 4 | Ref. 2-4 | 1.1–1.2 | " |
| 5 | Ref. 2-5 | 0.7–0.8 | " |
| 6 | Ref. 2-7 | No image is formed | Comp. Example |
| 7 | Ref. 2-8 | 1.1–1.2 | This invention |

TABLE 3-continued

| No. | Coating composition used in Examples 1 and 2 | Density of image | Note |
|---|---|---|---|
| 8 | Comparison sheet I | No image is formed | Comp. Example |

EXAMPLE 4

Three sheets of electrostatic record material are produced in the same manner as in Example 3 except that three kinds of electroconductive coating compositions obtained in Reference Examples 3 to 5 are employed in place of those used in Example 3. Each of the sheets thus obtained is checked for a density of image. The results are shown in Table 4 below.

TABLE 4

| No. | Coating Composition used in Example 8 | Density of image |
|---|---|---|
| 1 | Ref. 3 | 1.0–1.1 |
| 2 | Ref. 4 | 0.6–0.7 |
| 3 | Ref. 5 | 0.9–1.0 |

I claim:

1. An electrostatic record material comprising an electroconductive base sheet and a record layer formed on the base sheet containing an insulating resin, wherein the electroconductive base sheet has an electroconductive layer containing (i) a zinc oxide powder having a specific resistivity of 0.01 to 500 ohm-cm at pressure of 150 kg/cm$^2$ measured after standing at 20° C. and 60% RH for 2 hours, and (ii) a water-soluble or water-dispersible adhesive resin, the zinc oxide powder being prepared by admixing with zinc oxide a small amount of at least one of $Al_2O_3$, $Cr_2O_3$, $Ga_2O_3$, $In_2O_3$ and a compound which produces such an oxide when heated at a high temperature, and heating the mixture at a high temperature.

2. An electrostatic record material as defined in claim 1 wherein the zinc oxide powder has a specific resistivity of 1 to 400 ohm-cm.

3. An electrostatic record material as defined in claim 1 wherein the electroconductive layer contains (i) 100 parts by weight of a zinc oxide powder and (ii) 3 to 50 parts by weight of a water-soluble or water-dispersible adhesive resin.

4. An electrostatic record material as defined in claim 1 wherein the water-soluble or water-dispersible adhesive resin is at least one species selected from the group consisting of methyl cellulose, hydroxyethyl cellulose, carboxylmethyl cellulose, starch, oxidized starch, etherified starch, esterified starch, polyvinyl alcohol, polyvinyl pyrrolidone, sodium alginate, polyacrylamide, alkali salts of isobutene-maleic anhydride copolymer, alkali salts of styrene-maleic anhydride copolymer, alkali salts of styrene-methacrylic acid copolymer, styrene-butadiene copolymer latex, methyl methacrylate-butadiene copolymer latex, polyvinyl acetate latex and polyacrylic acid latex.

5. An electrostatic record material as defined in claim 1 wherein the water-soluble or water-dispersible adhesive resin is at least one of electroconductive resins.

* * * * *